(12) United States Patent
Shoji et al.

(10) Patent No.: US 6,198,581 B1
(45) Date of Patent: Mar. 6, 2001

(54) FINDER PRISM

(75) Inventors: Masao Shoji; Katsuhiro Ohtake; Osamu Inaba, all of Omiya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/229,125

(22) Filed: Jan. 12, 1999

(30) Foreign Application Priority Data

Mar. 31, 1998 (JP) .................................................. 10-086729

(51) Int. Cl.⁷ .............................. G02B 5/04; G03B 13/02
(52) U.S. Cl. .................... 359/831; 359/834; 396/384; 396/147; 396/148
(58) Field of Search ........................ 359/831, 833, 359/834, 835, 836; 396/373, 384, FOR 859, 141, 147, 148, 149, 150, 152, 276

(56) References Cited

U.S. PATENT DOCUMENTS

| | | | |
|---|---|---|---|
| 2,984,145 | * | 5/1961 | Papke et al. . |
| 3,094,911 | * | 6/1963 | Reiche et al. . |
| 3,421,407 | * | 1/1969 | Hiruma . |
| 3,575,095 | * | 4/1971 | Keck ..................................... 396/384 |
| 3,900,858 | * | 8/1975 | McCann et al. . |
| 4,047,222 | * | 9/1977 | Moskovich et al. ................. 396/384 |
| 4,064,516 | * | 12/1977 | McLaughlin et al. ............... 396/384 |
| 4,106,038 | * | 8/1978 | Kawakita et al. . |
| 4,231,649 | * | 11/1980 | Kimura et al. . |
| 4,297,020 | * | 10/1981 | Yamada et al. ...................... 396/384 |
| 4,519,685 | * | 5/1985 | Momiyama et al. . |
| 4,634,223 | * | 1/1987 | Ishii .................................... 359/834 |
| 5,034,764 | * | 7/1991 | Inabata . |
| 5,095,326 | * | 3/1992 | Nozaki et al. ....................... 359/831 |
| 5,233,475 | * | 8/1993 | Ohshita ............................... 359/836 |
| 5,838,504 | * | 11/1998 | Ichikawa et al. .................... 359/835 |

FOREIGN PATENT DOCUMENTS

| | | |
|---|---|---|
| 5-22890 | 1/1993 | (JP) . |
| 2629690 | 4/1997 | (JP) . |

\* cited by examiner

*Primary Examiner*—Ricky D. Shafer
(74) *Attorney, Agent, or Firm*—Arnold International; Bruce Y. Arnold

(57) ABSTRACT

It is an object of the present invention to provide a finder prism capable of forming some in-finder information such as an automatic focus target mark and a short distance correction mark by virtue of extremely narrow lines. In detail, the finder prism is provided between an objective lens and an ocular lens, and is adapted to transmit an object image to a camera user under a condition where an automatic focus target mark and an short distance correction mark are overlapped on a photographing object image. In particular, the prism is made of a resin, a shouldered portion is formed on one surface of the prism from which the object light is allowed to exit during a photographing process, thereby forming some in-finder information such as an automatic focus target mark and an short distance correction mark.

3 Claims, 2 Drawing Sheets

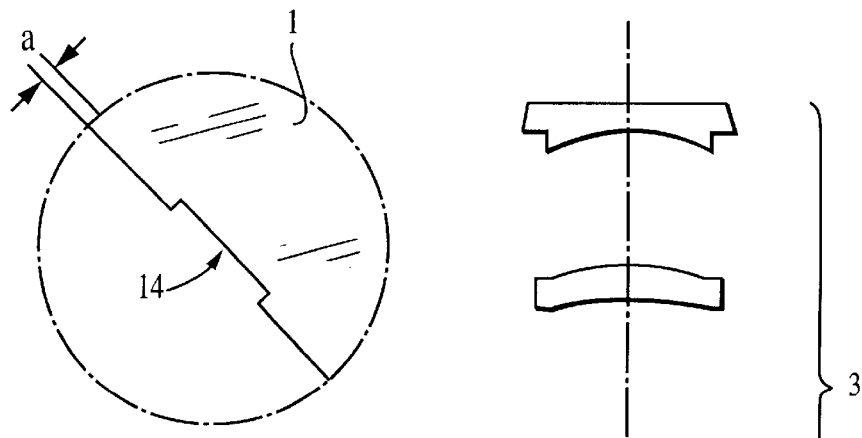
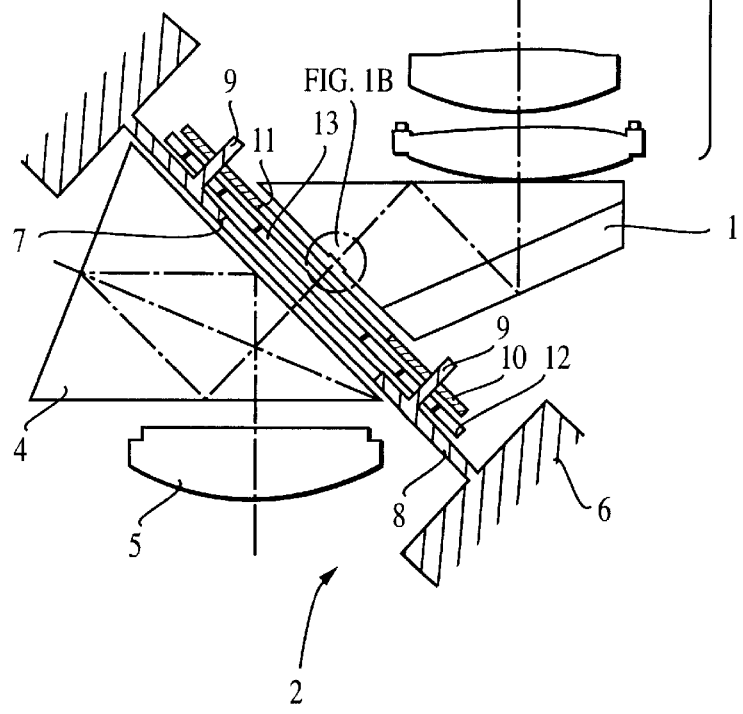
FIG. 1B
FIG. 1A

FINDER PRISM

BACKGROUND OF THE INVENTION

1. Field of the Invention

The present invention relates to a prism of a finder which is used in a camera, in particular a finder prism which is provided with a shoulder portion so that lines are formed so as to be visible within the field of view of the finder.

2. Description of the Related Art

Conventionally, a finder of a camera is formed with some in-finder information formed on itself, such as automatic focus target marks and short range correction marks. Such marks are formed by virtue of special lines formed in predetermined positions on a surface of a certain plate-like element.

A commonly used means for forming such in-finder information has been disclosed in Japanese Patent No. 2629690, which teaches that desired lines may be directly formed on a glass plate (i.e., a reticle) by means of an etching treatment.

Under the above-mentioned condition, however, since lines are formed on a glass plate by means of an etching treatment, when light passes therethrough, some problems occur which are associated with the depth of the etching treatment. Namely, when light passes therethrough, the reflectance from the surface of the glass plate will be different from the reflectance from the etched portions. As a result, it will appear to a person using the finder as if each single line is instead two lines.

In order to solve the above problem, Japanese Patent Publication 5-22890 has disclosed an improved finder prism in which the cross sections of convex portions (i.e., protrusions) and the cross sections of concave portions (i.e., grooves) are semi-circular, and the surfaces of the convex and concave portions are made to include a light dispersing structure.

However, when the cross sections of the convex portions and the concave portions are made into generally semi-circular shapes the corresponding manufacturing process becomes too complex, and thus the production cost is high.

Further, since the cross sections of the convex portions and the concave portions are substantially circular and since it is these cross sections that are then etched so as to be made visible to the user, it becomes difficult to avoid a problem of the width of the lines being large.

BRIEF SUMMARY OF THE INVENTION

A first object of the present invention is to provide an improved finder prism in which lines are directly formed on a prism, and said lines are made so as to have a narrow width. A second object of the invention is to enable the prism 1 to be manufactured at low cost.

In order to solve the above problems, according to the present invention, there is provided a finder prism, located between an objective lens and an ocular lens, adapted to transmit an image of an object to a camera user under a condition where an automatic focus target mark and a short distance correction mark are both visible when photographing an object. The prism is made of a resin, and a shoulder portion having a height either higher or lower than the face of the prism from which light from an object exits during a photographing process, thereby forming in-finder information such as an automatic focus target mark and a short distance correction mark on the prism.

Further, the difference in height of the shoulder portion relative to the exit face is in the range of 0.001–0.5 mm.

Moreover, either a recessed portion or a protruding portion is formed on the above one surface of the prism by virtue of the formation of the above-mentioned shoulder portion.

With the present invention, it is possible to form in-finder information such as an automatic focus target mark and a short distance correction mark by directly forming lines on the prism. Further, when looking into the finder, the lines of in-finder information such as an automatic focus target mark and a short distance correction mark may be viewed as having an extremely narrow width.

BRIEF DESCRIPTION OF THE DRAWINGS

FIGS. 1A and 1B are explanatory views schematically illustrating a finder device containing a prism made according to a first embodiment of the present invention.

DETAILED DESCRIPTION

Figures 2A, 2B:
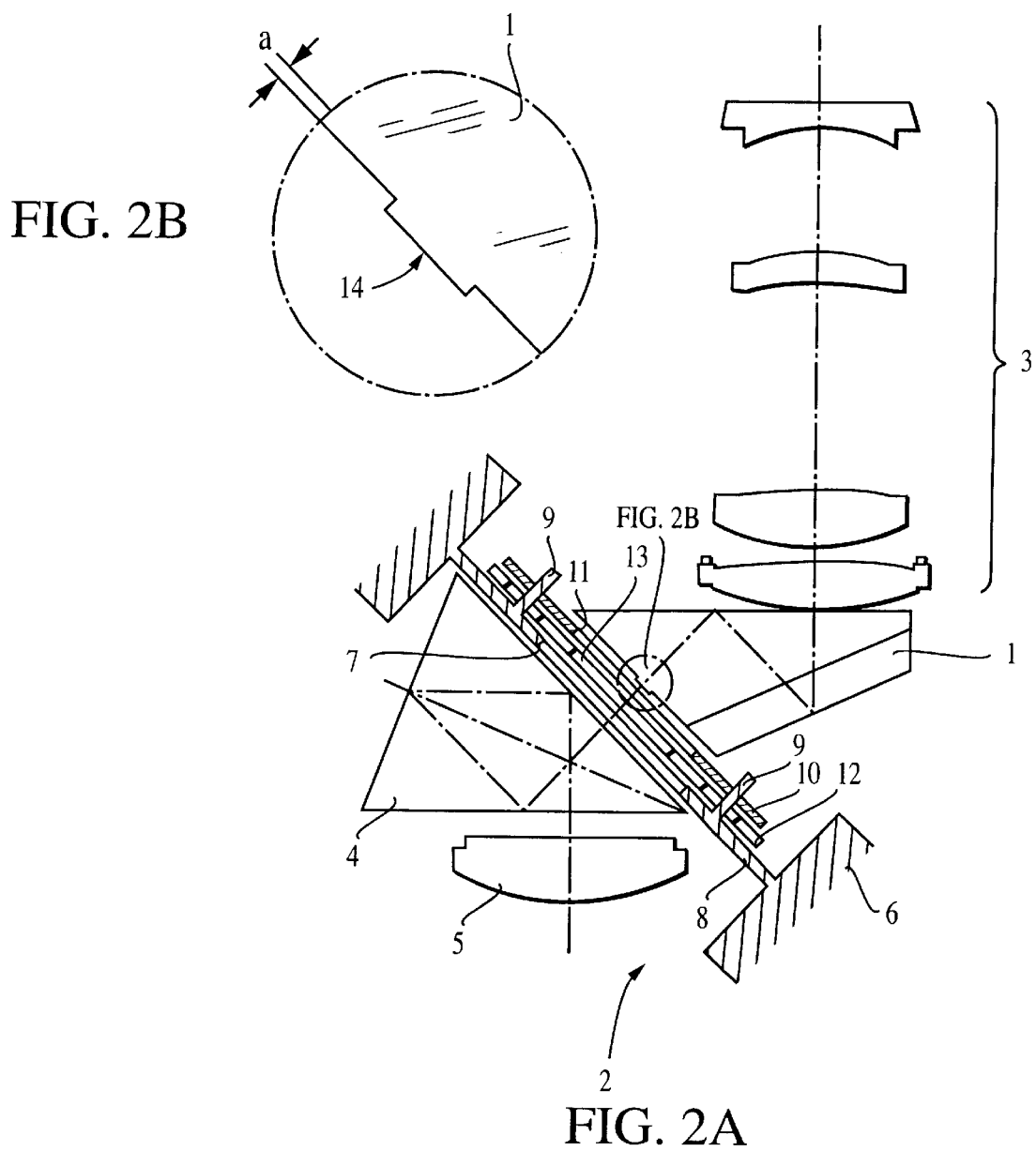
FIGS. 2A and 2B are explanatory views schematically illustrating a finder device containing a prism made according to a second embodiment of the present invention.

Preferred embodiments of the present invention will now be described with reference to the Figures. In FIGS. 1A and 1B there are illustrated explanatory views schematically indicating a finder device containing a prism made according to a first embodiment of the present invention. As shown in FIG. 1A, the finder device 2 is provided with a finder prism 1 formed as a roof prism. Light from an object being photographed passes through an objective lens 3 which includes several lens elements. The direction of propagation of the light is changed by the prism 1 so that the light is then incident on a prism 4. After being reflected several times within the prism 4, the light then passes through an ocular lens 5.

Between the prism 1 and the prism 4 there is provided a finder frame plate 8. The finder frame plate 8 is integrally formed with a finder frame body 6 in the vicinity of the prism 4, and has a void space 7 in the center portion thereof. Further, on either side of the void space 7 there is a pin 9 which protrudes from the finder frame plate 8.

The two pins 9 which protrude from the finder frame plate 8 pass through holes formed in a visual field frame 10 in a region adjacent to the periphery thereof. The visual field frame 10 has a void space 11 in its center. In this way, the visual field frame 10 may be fixed in position by means of the two pins 9.

Further, between the finder frame plate 8 which is integrally formed with the finder frame body 6 and the visual field frame 10, there is provided an image size change-over mask 12. The image size change-over mask 12 includes a plurality of elements, which form a void space 13 in the center thereof so that the size of the void space is changeable.

The image size change-over mask 12 has all its elements held in place by two pins 9. The image size, i.e., the size of the void space 13 in the center of the mask 12, may be changed by means of an operating link (not shown).

In fact, the image size change-over mask 12 is fabricated in a manner such that the void space 13 for passing light therethrough has a square configuration and its size is changeable among a standard size (C), a high vision size (H), and a panorama size (P), as disclosed in Japanese Laid-Open Patent Application No. 6-82882.

The finder frame plate 8, the image size change-over mask 12 and the visual field frame 10 are assembled in the manner as shown in FIG. 1A, with the central void space 7 of the finder frame plate 8 and the central void space 11 of the visual field frame 10 being fixed in their sizes, but the central void space 13 of the image size change-over mask 12 being changeable in its size. On the other hand, even though the central void space 13 of the image size change-over mask 12 is changeable among a standard size (C), a high vision size (H) and a panorama size (P), the central void space 13 will never be changed into a larger size than the void space 7 of the finder frame plate 8. Further, the above roof prism 1 is made of a resin.

FIG. 1B illustrates an enlarged view of the portion of FIG. 1A shown within the dashed-line circle. On a surface of roof prism 1 a recessed portion 14 is formed. The surface in which the recessed portion is formed is the surface of prism 1 which faces prism 4. As illustrated, the recessed portion 14 forms a shoulder which is a distance "a" from the surface of the prism 1, with "a" being in the range of 0.001–0.5 mm.

As a method for forming the recessed portion 14 on a resin prism to serve as prism 1, it is possible that a protruding shoulder portion may be provided on the surface of a metal mold when molding the prism 1 so as to transcript the shoulder as a recessed region onto the surface of the prism 1. Alternatively to using a rectangular-shaped shoulder, it is possible to form prism 1 having a recessed portion (not illustrated) by the use of a metal mold having an inverted V-shape (not illustrated).

On the other hand, provided that there is a shoulder formed on the surface of the prism 1, it is not absolutely necessary to form a recessed portion 14. In fact, it is also possible to form a convex portion that protrudes, instead. Therefore, in a process where a prism 1 (such as a roof prism) is formed using a resin, it is possible to use a metal mold having a protruding portion (i.e., a convex portion) so as to provide a recessed portion in a surface to be molded. Alternatively, it is also possible to use a metal mold having a recessed portion (i.e., a concave portion) so as to provide a protruding portion (i.e., a convex portion) on said one surface of the prism 1 during the molding process.

When using a finder device containing the prism 1 having the above-described configuration, light from an object to be photographed is allowed to pass through an objective lens 3 formed of a plurality of objective lens elements. Then, once the light arrives at the prism 1, its direction of propagation will be changed and the light will pass out of the prism 1, and will further pass through the central void space 11 of the visual field frame 10, the central void space 13 of the image size change-over mask 12, and the central void space 7 of the finder frame plate 8. Afterwards, the light will enter the prism 4 so as to be redirected and pass through the ocular lens 5.

If, under the above-described condition, an observation is conducted by a user looking into the ocular lens 5, since the recessed portion 14 is formed on the light exiting surface of the prism 1, and since the corner lines of the shoulder of the recessed portion 14 can be easily seen, these lines may be viewed as lines having an extremely narrow width.

Therefore, if some in-finder information such as an automatic focus target mark and a short distance correction mark are formed on the exit face by virtue of the recessed portion 14, these marks may be viewed as lines having an extremely narrow width. In this way, even if the above marks are positioned within an image of an object to be photographed, these marks will not become obstacles to any formed images.

FIGS. 2A and 2B are identical to FIGS. 1A and 1B, except that the shoulder portion 14 protrudes from the exit face of the prism 1. Thus, no further description of these figures will be provided.

With the use of the above structures provided according to the present invention, a desired recessed or protruding portion may be integrally formed on the prism 1 during the formation of the prism 1 by molding, so that manufacturing the prism 1 becomes easy. Further, since corner lines of the shoulder may be clearly seen when looking into the finder, and since these corner lines have an extremely narrow width, it is possible to ensure that these marks will not become obstacles to any images formed of objects to be photographed.

What is claimed is:

1. A finder prism provided between an objective lens and an ocular lens of a camera, said finder prism being formed of a resin and comprising:

two surfaces on an exit face of said finder prism through which light from an object being photographed passes in traveling from the objective lens to the ocular lens, said two surfaces being a peripheral portion of the face that is at one height, and a portion within the peripheral portion that is at a different height; wherein light from an object being photographed passes through both the peripheral portion and the portion within the peripheral portion, with an interface between the two surfaces forming at least one line that is visible to an observer looking at the object through said ocular lens, thereby enabling an observer to align the camera in photographing the object; and the difference in heights between the peripheral portion and the portion within the peripheral portion is in the range of 0.001–0.5 mm.

2. The finder prism of claim 1, wherein the portion within the peripheral portion lies nearer the ocular lens than does said peripheral portion.

3. A finder prism provided between an objective lens and an ocular lens of a camera, said finder prism being formed of a resin and comprising:

two surfaces on an exit face of said finder prism through which light from an object being photographed passes in traveling from the objective lens to the ocular lens, said two surfaces being a peripheral portion of the face that is at one height, and a portion within the peripheral portion that is at a different height; wherein light from an object being photographed passes through both the peripheral portion and the portion within the peripheral portion, with an interface between the two surfaces forming at least one line that is visible to an observer looking at the object through said ocular lens, thereby enabling an observer to align the camera in photographing the object; and the portion within the peripheral portion lies nearer the objective lens than does said peripheral portion.

* * * * *